United States Patent
Lin et al.

(10) Patent No.: US 10,629,969 B2
(45) Date of Patent: Apr. 21, 2020

(54) BATTERIES AND BATTERY MANUFACTURING METHODS

(71) Applicant: Sonova AG, Stäfa (CH)

(72) Inventors: Chuangang Lin, Fremont, CA (US); Stuart Wenzel, San Carlos, CA (US); Paul Wagner, San Carlos, CA (US); Michael Au, Union City, CA (US)

(73) Assignee: Sonova AG, Staefa (CH)

( * ) Notice: Subject to any disclaimer, the term of this patent is extended or adjusted under 35 U.S.C. 154(b) by 489 days.

(21) Appl. No.: 15/326,599

(22) PCT Filed: Jul. 27, 2014

(86) PCT No.: PCT/US2014/048336
§ 371 (c)(1),
(2) Date: Jan. 16, 2017

(87) PCT Pub. No.: WO2016/018200
PCT Pub. Date: Feb. 4, 2016

(65) Prior Publication Data
US 2017/0207506 A1    Jul. 20, 2017

(51) Int. Cl.
*H01M 12/02* (2006.01)
*H01M 12/06* (2006.01)

(52) U.S. Cl.
CPC ........... *H01M 12/02* (2013.01); *H01M 12/06* (2013.01)

(58) Field of Classification Search
None
See application file for complete search history.

(56) References Cited

U.S. PATENT DOCUMENTS

| | | | |
|---|---|---|---|
| 3,479,225 A | 11/1969 | Chodosh et al. | |
| 3,594,514 A | 7/1971 | Wingrove | |
| 3,764,748 A | 10/1973 | Branch et al. | |
| 3,813,922 A * | 6/1974 | Oswald | G01M 3/3254 |
| | | | 73/49.2 |
| 3,870,832 A | 3/1975 | Fredrickson et al. | |
| 3,882,285 A | 5/1975 | Nunley et al. | |
| 4,189,526 A | 2/1980 | Cretzmeyer et al. | |
| 4,404,266 A | 9/1983 | Smilanich | |
| 4,442,917 A | 4/1984 | Johnson et al. | |
| 4,606,329 A | 8/1986 | Hough et al. | |
| 4,628,907 A | 12/1986 | Epley et al. | |
| 4,756,312 A | 7/1988 | Epley et al. | |
| 4,776,322 A | 10/1988 | Hough et al. | |
| 4,817,607 A | 4/1989 | Tatge et al. | |
| 4,817,609 A | 4/1989 | Perkins et al. | |

(Continued)

OTHER PUBLICATIONS

TM Electronics, "Leak, Flow and Package Testing 101," 2008 (month unknown), available at: http://www.tmelectronics.com/userfiles/files/Leak-Flow-Testing-101-08232013.pdf (Year: 2008).*

(Continued)

*Primary Examiner* — Amanda J Barrow
(74) *Attorney, Agent, or Firm* — Henricks Slavin LLP

(57) ABSTRACT

A battery manufacturing method including the steps of testing a cathode assembly that includes an air cathode and a battery can cathode portion that is not connected to a battery can anode portion, and joining an anode assembly, including a battery can anode portion in which anode material is located, to the tested cathode assembly.

10 Claims, 5 Drawing Sheets

(56) References Cited

U.S. PATENT DOCUMENTS

| | | |
|---|---|---|
| 4,840,178 A | 6/1989 | Heide et al. |
| 4,927,717 A | 5/1990 | Turley et al. |
| 4,957,478 A | 9/1990 | Maniglia et al. |
| 5,015,224 A | 5/1991 | Maniglia et al. |
| 5,015,225 A | 5/1991 | Hough et al. |
| 5,163,957 A | 11/1992 | Sade et al. |
| 5,220,612 A | 6/1993 | Tibbetts et al. |
| 5,220,918 A | 6/1993 | Heide et al. |
| 5,259,032 A | 11/1993 | Perkins et al. |
| 5,282,858 A | 2/1994 | Bisch et al. |
| 5,338,287 A | 8/1994 | Miller et al. |
| 5,390,254 A | 2/1995 | Adelman et al. |
| 5,401,920 A | 3/1995 | Oliveira et al. |
| 5,425,104 A | 6/1995 | Shennib et al. |
| 5,430,801 A | 7/1995 | Hill et al. |
| 5,456,654 A | 10/1995 | Ball et al. |
| 5,531,787 A | 7/1996 | Lesinski et al. |
| 5,554,096 A | 9/1996 | Ball et al. |
| 5,572,594 A | 11/1996 | Devoe et al. |
| 5,572,954 A | 11/1996 | Elkins |
| 5,587,259 A | 12/1996 | Dopp et al. |
| 5,624,376 A | 4/1997 | Ball et al. |
| 5,654,530 A | 8/1997 | Sauer et al. |
| 5,682,020 A | 10/1997 | Oliveira et al. |
| 5,701,348 A | 12/1997 | Shennib et al. |
| 5,708,720 A | 1/1998 | Meyer et al. |
| 5,724,431 A | 3/1998 | Reiter et al. |
| 5,825,896 A | 10/1998 | Leedom et al. |
| 5,833,626 A | 11/1998 | Leysieffer et al. |
| 5,881,159 A | 3/1999 | Aceti et al. |
| 5,949,895 A | 9/1999 | Ball et al. |
| 5,982,908 A | 11/1999 | Bauman et al. |
| 6,042,957 A | 3/2000 | Oltman et al. |
| 6,058,198 A | 5/2000 | Aceti et al. |
| 6,087,030 A | 7/2000 | Collien et al. |
| 6,137,889 A | 10/2000 | Shennib et al. |
| 6,205,227 B1 | 3/2001 | Mahoney et al. |
| 6,208,741 B1 | 3/2001 | Shennib et al. |
| 6,212,283 B1 | 4/2001 | Fletcher et al. |
| 6,229,900 B1 | 5/2001 | Leenen |
| 6,283,915 B1 | 9/2001 | Aceti et al. |
| 6,359,993 B2 | 3/2002 | Brimhall |
| 6,389,143 B1 | 5/2002 | Leedom et al. |
| 6,408,081 B1 | 6/2002 | Boesen |
| 6,410,997 B1 | 6/2002 | Sjursen et al. |
| 6,473,511 B1 | 10/2002 | Aceti et al. |
| 6,473,513 B1 | 10/2002 | Shennib et al. |
| 6,567,527 B1 * | 5/2003 | Baker ................ H01M 2/0202 381/322 |
| 6,620,110 B2 | 9/2003 | Schmid |
| 6,643,378 B2 | 11/2003 | Schumaier |
| 6,648,813 B2 | 11/2003 | Zilberman et al. |
| 6,658,126 B1 | 12/2003 | Stern |
| 6,751,327 B1 | 6/2004 | Urso et al. |
| 6,865,279 B2 | 3/2005 | Leedom |
| 6,962,170 B1 | 11/2005 | Sherman et al. |
| 7,010,137 B1 | 3/2006 | Leedom et al. |
| 7,092,543 B1 | 8/2006 | Mahoney et al. |
| 7,113,611 B2 | 9/2006 | Leedom et al. |
| 7,215,789 B2 | 5/2007 | Shennib et al. |
| 7,221,768 B2 | 5/2007 | Sjursen et al. |
| 7,379,555 B2 | 5/2008 | Gable et al. |
| 7,403,629 B1 | 7/2008 | Aceti et al. |
| 7,536,023 B2 | 5/2009 | Leedom et al. |
| 7,987,977 B2 | 8/2011 | Leedom et al. |
| 8,068,630 B2 | 11/2011 | Gable et al. |
| 8,808,906 B2 | 8/2014 | Wenzel et al. |
| 2003/0010808 A1 | 1/2003 | Uhland et al. |
| 2003/0228522 A1 * | 12/2003 | Yang ................ H01M 12/06 429/306 |
| 2004/0115517 A1 * | 6/2004 | Fukuda ............... H01M 4/8605 294/17 |
| 2004/0146764 A1 | 7/2004 | Tsai et al. |
| 2005/0112458 A1 * | 5/2005 | Dopp .................... H01M 2/02 429/174 |
| 2006/0204839 A1 * | 9/2006 | Richards ............ H01M 2/0257 429/137 |
| 2010/0255375 A1 * | 10/2010 | Jiang .................. H01M 2/1646 429/231.5 |
| 2012/0189908 A1 * | 7/2012 | Tsutsumi ............... H01G 9/016 429/179 |
| 2013/0061661 A1 * | 3/2013 | Morel ............... H01M 10/4285 73/40.7 |
| 2013/0125387 A1 | 5/2013 | Wenzel et al. |
| 2013/0130097 A1 | 5/2013 | Wenzel et al. |

OTHER PUBLICATIONS

PCT Search Report and Written Opinion dated Sep. 30, 2014 for PCT App. Ser. No. PCT/US2014/048336.

* cited by examiner

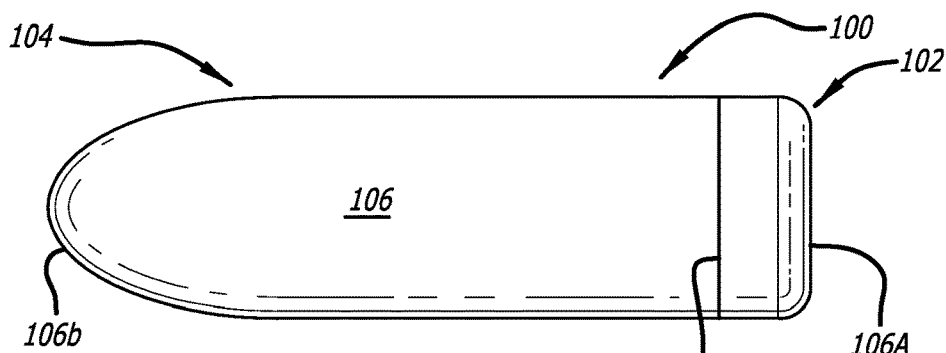
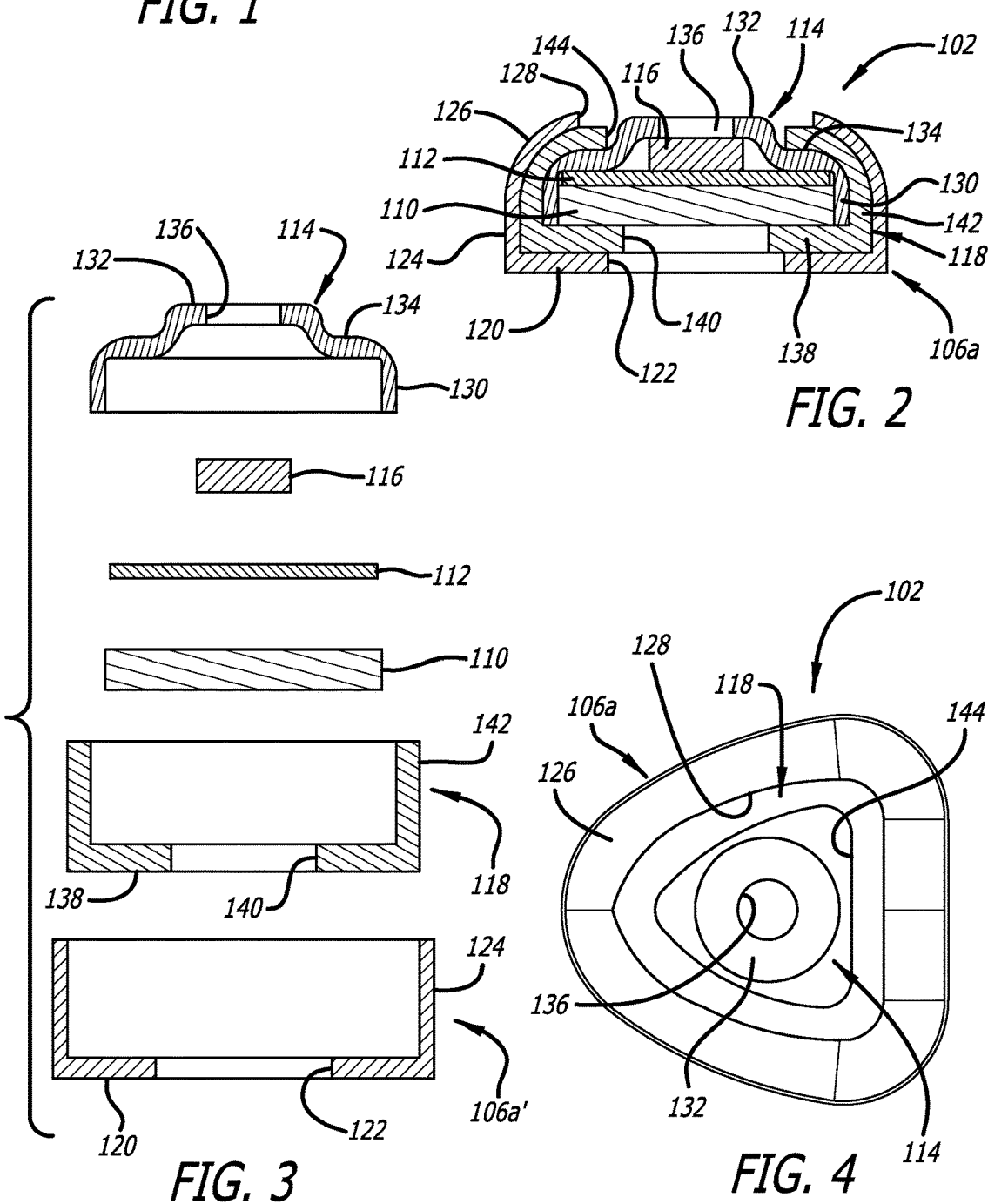

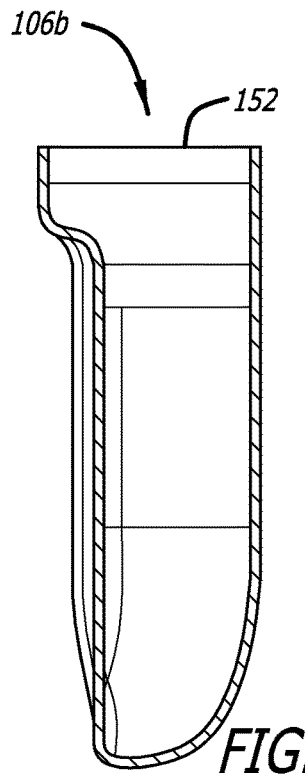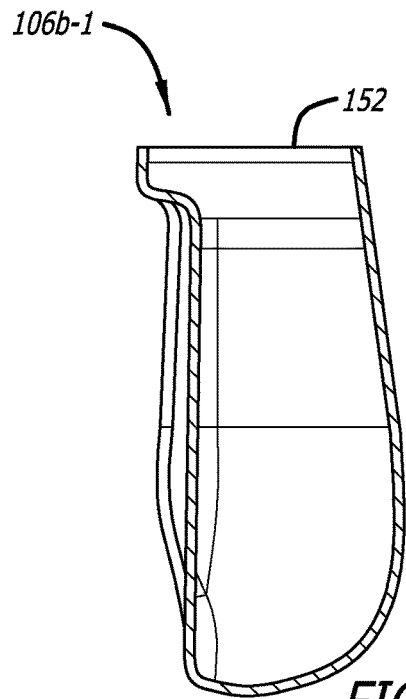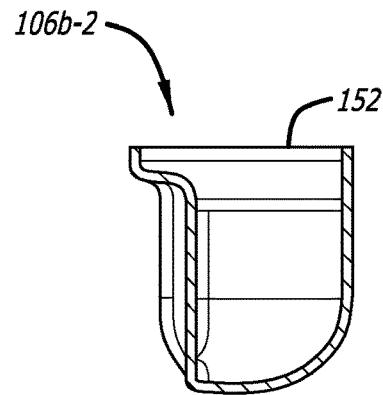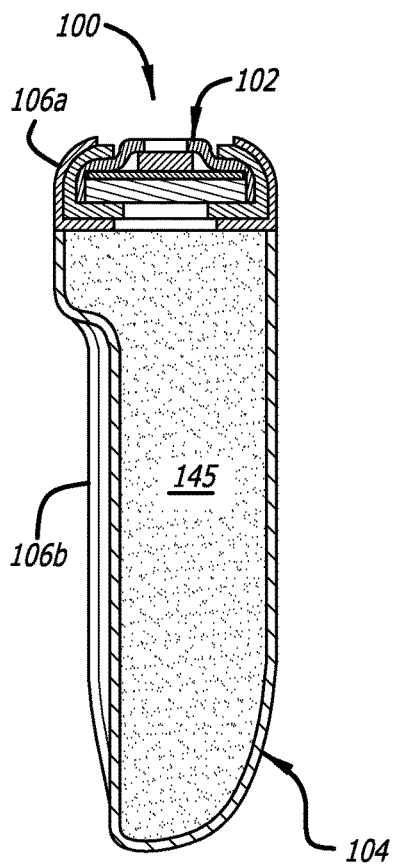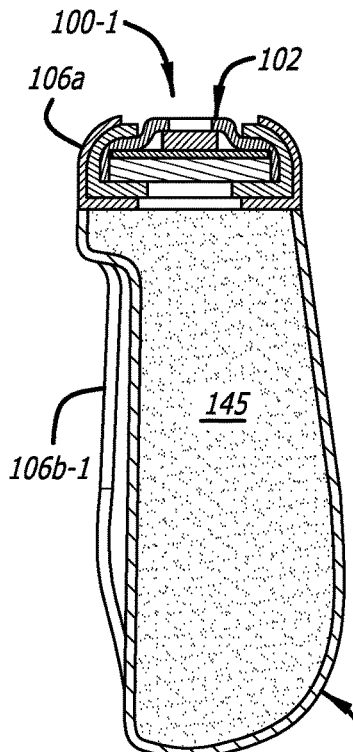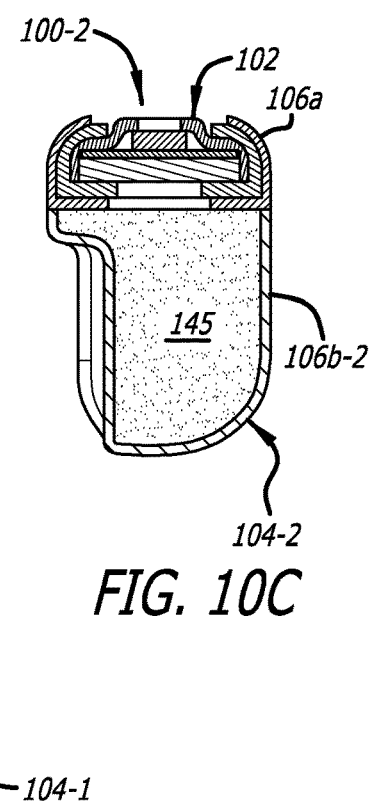

BATTERIES AND BATTERY MANUFACTURING METHODS

CROSS-REFERENCE TO RELATED APPLICATIONS

This application is the U.S. National Stage of PCT App. Ser. No. PCT/US2014/050853, filed Jul. 27, 2014.

BACKGROUND

1. Field

The present inventions relate generally to batteries and methods of making the same.

2. Description of the Related Art

Metal-air batteries (such as zinc-air batteries) are frequently used in hearing devices because of their volumetric energy efficiency. Such batteries can be a challenge to design and manufacture because the cathode must have access to oxygen (i.e., air) and the electrolyte solution, commonly a very slippery sodium hydroxide solution or potassium hydroxide solution, must be contained within the battery can without leaking. The conventional method of containing the electrolyte within the battery involves crimping cathode assembly into an anode can with a sealing grommet between the two. Due to the challenges associated with mass production, the most common crimped battery is the button battery, which includes short, cylindrical anode and cathode cans that can be stamped (or drawn) and crimped uniformly. Commonly assigned U.S. Pat. No. 6,567,527 ("the '527 patent") discloses a zinc-air battery that has a bullet-shaped battery can with an aspect ratio, i.e., the ratio of the length to the maximum dimension of the cross-section, that is higher than that of a button battery. The higher aspect ratio of the battery can is especially useful in, for example, deep in the canal hearing aids. The battery can in the '527 patent has an internal retention ledge to support the air cathode. The air cathode is crimped into the battery can while the battery can is supported from below. The crimp force must not, however, exceed the buckling strength of the bullet-shaped can, which limits the aspect ratio and the ability to form a leak tight seal. More recently, batteries having cans with inwardly extending neck portions that define external retention ledges that facilitate the use of still higher aspect ratios and greater crimping force (for improved sealing at the grommet) have been introduced. Examples of such batteries, which are especially useful in extended wear hearing devices that are worn completely in the bony region of the ear canal, may be found in commonly assigned U.S. Pat. No. 8,761,423.

SUMMARY

The present inventors have determined that the conventional metal-air battery manufacturing methods are susceptible to improvement. For example, although the use of a neck portion in the battery can represented an advance in the art, the present inventors have determined that the use of a neck portion can increase the cost of the battery can and also reduce the internal volume available to store anode material. As such, battery manufacturing methods that facilitate the use of elongate, asymmetrical, or otherwise irregularly shaped battery cans as well as a leak tight seal between the battery can and the cathode without the use of a neck portion would be a further advance in the art.

A method in accordance with at least one of the present inventions includes the steps of testing a cathode assembly that includes an air cathode and a battery can cathode portion that is not connected to a battery can anode portion, and joining an anode assembly, including a battery can anode portion in which anode material is located, to the tested battery can cathode assembly.

A method in accordance with at least one of the present inventions includes the steps of sealing an air cathode within a battery can cathode portion that is not connected to a battery can anode portion to form a cathode assembly, and after the sealing step, joining an anode assembly, including a battery can anode portion in which anode material is located, to the cathode assembly.

The above described and many other features of the present inventions will become apparent as the inventions become better understood by reference to the following detailed description when considered in conjunction with the accompanying drawings.

BRIEF DESCRIPTION OF THE DRAWINGS

Detailed descriptions of the exemplary embodiments will be made with reference to the accompanying drawings.

FIG. 1 is a bottom view of a battery in accordance with one embodiment of a present invention.

FIG. 2 is a side section view of a cathode assembly in accordance with one embodiment of a present invention.

FIG. 3 is an exploded view of showing the components of the cathode assembly illustrated in FIG. 2.

FIG. 4 is an end view of the battery illustrated in FIG. 1.

FIGS. 9a-9c are side section views of battery can anode portions in accordance with various embodiments of a present invention.

FIGS. 10a-10c are side section views of batteries in accordance with various embodiments of a present invention.

DETAILED DESCRIPTION OF EXEMPLARY EMBODIMENTS

The following is a detailed description of the best presently known modes of carrying out the inventions. This description is not to be taken in a limiting sense, but is made merely for the purpose of illustrating the general principles of the inventions. To that end, the present inventions may be embodied in a wide variety of batteries and hearing assistance devices including such batteries. Various aspects of the batteries (e.g., size, shape, materials) may vary so as to permit their use in a variety of hearing assistance devices.

Figure 5:
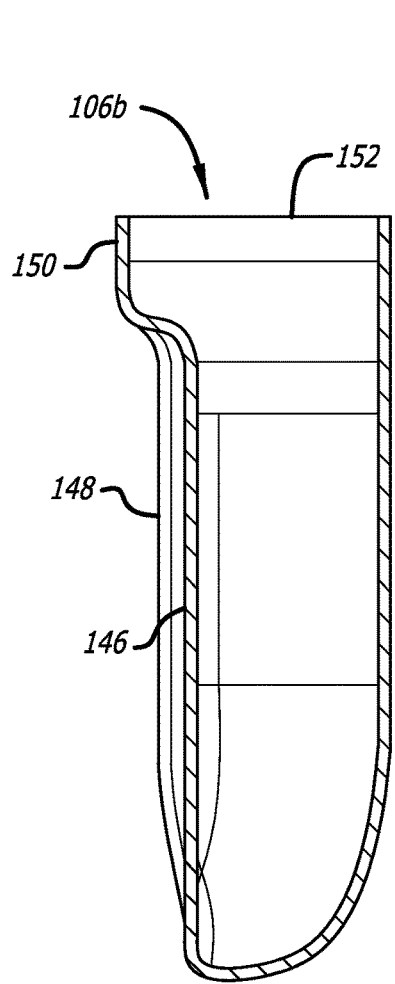
FIG. 5 is a side section view of a battery can anode portion in accordance with one embodiment of a present invention.
Figure 7:
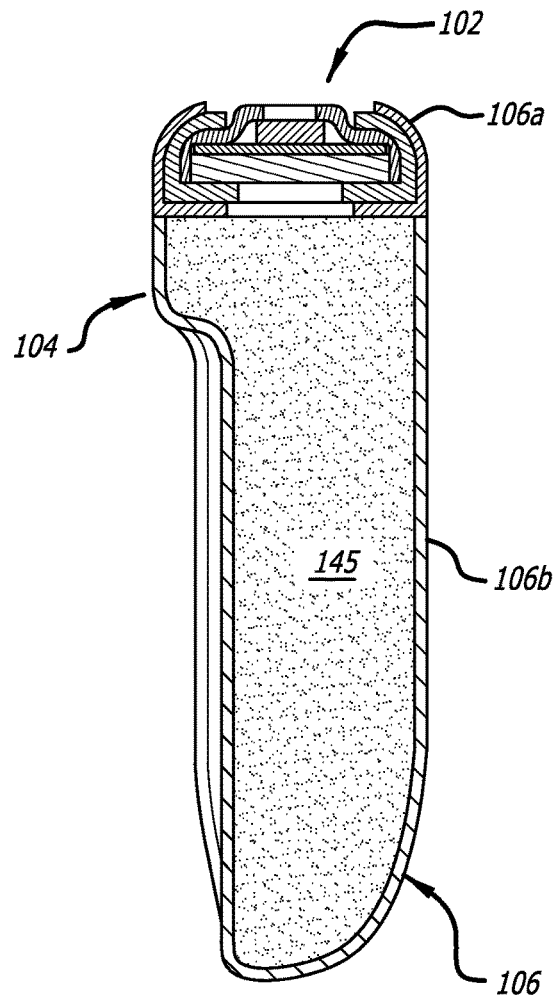
FIG. 7 is a side section view of the battery illustrated in FIG. 1.
Figure 6:
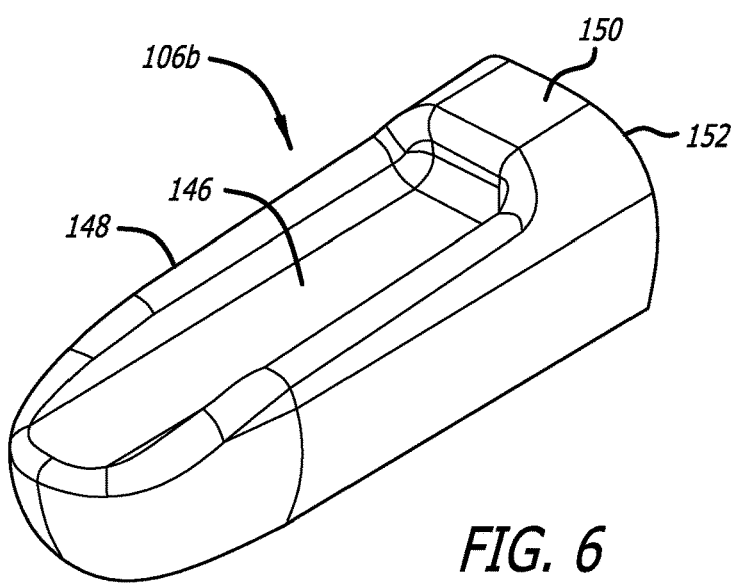
FIG. 6 is a perspective view of the battery can anode portion illustrated in FIG. 5.

As illustrated in FIG. 1, an exemplary battery 100 in accordance with one embodiment of a present invention has a cathode assembly 102 and an anode assembly 104. The exemplary cathode assembly 102 includes a battery can cathode portion 106a and an air cathode 110 (described below with reference to FIGS. 2-4), and the exemplary anode assembly 104 includes a battery can anode portion 106b and anode material 145 (described below with reference to FIG. 7). The cathode assembly 102 and anode assembly 104 are initially separate, individually formed structural elements that are joined to one another during the manufacturing process after the formation of the cathode assembly and, in some manufacturing process implementations, joined to one another after testing of the completed separate cathode assembly. For example, as described below, the battery can cathode portion 106a may be joined to the battery can anode portion 106b at a joint 108 to form a battery can 106 and complete the battery 100.

There are a variety of advantages associated with battery manufacture methods that involve forming the sealed cathode assembly separate from the anode assembly. By way of example, but not limitation, the amount of crimpling force applied to the battery can cathode portion when the air cathode is sealed within into the cathode portion is not limited by the amount of force that the anode portion can withstand without buckling. As such, a leak tight seal between the battery can and the air cathode can be achieved without the use of a neck portion and despite the fact that an elongate, asymmetrical, and/or otherwise irregularly shaped battery can anode portion is employed. The wall thickness of the battery can may also be reduced, as compared to an otherwise identical battery can manufactured by conventional methods, thereby increasing storage volume without increasing the overall volume. Forming the cathode assembly separate and apart from the anode assembly also facilitates the use of modular manufacturing processes where, for example, identical cathode assemblies produced in high volumes may be combined with differently sized and shaped anode assemblies as is discussed below with reference to FIGS. 9a-10c. Thus, batteries may be designed to minimize size and maximize the fit rate of the associated hearing assistance device, or to maximize battery capacity, without redesigning the cathode assembly or retooling the apparatus used to manufacture the cathode assembly. The cathode and anode assemblies may also, if so desired, be formed at different times and/or at different locations. The crimped cathode assemblies may also be tested prior to being combined with an anode assembly. Given that issues associated with the cathode assembly (e.g., leakage and improper air flow or limiting current) are the primary reasons that completed batteries fail post manufacturing testing, testing cathode assemblies prior to final assembly increases battery yield.

Referring to FIGS. 2-4, the exemplary cathode assembly 102 includes, in addition to the battery can cathode portion 106a, an air cathode 110, a gas diffusion barrier 112 that regulates air flow into the air cathode, a cathode base 114, a filter 116 (e.g., filter paper), and an electrically insulating grommet 118 that insulates the air cathode and cathode base from the battery can cathode portion. The exemplary battery can cathode portion 106a includes a bottom wall 120 with a bottom aperture 122, a side wall 124 with a crimped region 126, and a top aperture 128 adjacent to the crimped region. The exemplary cathode base 114, which may be formed from a conductive material such as nickel plated stainless steel, is generally cup-shaped and includes a side wall 130, an end wall 132, undulating intermediate wall 134, and an air port 136 that extends through the end wall. The cathode base may be flat, annular or some other shape in other embodiments. The insulating grommet 118 has a bottom wall 138 with an aperture 140, a side wall 142, and an aperture 144. The grommet bottom wall 138 is positioned between the air cathode 110 and the bottom wall 120 of the battery can cathode portion 106a, while the grommet side wall 142 is positioned between the base side and intermediate walls 130 and 134 and the bottom and side walls 120 and 124 of the uncrimped battery can cathode portion 106a' (FIG. 3). The grommet bottom wall 138 presses the air cathode 110 into the cup-shaped cathode base 114, and the grommet aperture 140 is aligned with the bottom aperture 122 in the battery can cathode portion 106a. The grommet end wall 144 exposes the base end wall 132 for electrical connection thereto and exposes the air port 134 to the atmosphere. The insulating grommet 118 is compressed against the cathode base 114 by the crimp region 126 of the battery can cathode portion 106a to create a seal. Suitable electrically non-conductive materials for grommet 124 include, but are not limited to nylon and other chemically compatible thermoplastics and elastomers.

The exemplary battery 100 is a metal-air battery and, therefore, the anode material 145 (FIG. 7) is a metal. The metal in the illustrated embodiment is zinc. More specifically, the anode material 145 may be an amalgamated zinc powder with organic and inorganic compounds including binders and corrosion inhibitors. The anode material 145 also includes the electrolyte, typically an aqueous solution of potassium hydroxide (KOH) or sodium hydroxide (NaOH). Other suitable metals include, but are not limited to, lithium, magnesium, aluminum, iron and calcium as anode material for metal-air battery. Other battery chemistries, such as lithium primary, lithium-ion, silver zinc, nickel-metal-hydride, nickel zinc, nickel cadmium, may be used as the power source.

The illustrated air cathode 110 broadly represents several layers of materials known in the battery art. To that end, and although the present inventions are not limited to the illustrated embodiment, air (oxygen) reaches the air cathode 110 by way of the air port 136. A cathode catalyst facilitates oxygen reduction in the presence of electrons provided by a metallic mesh with the production of hydroxyl ions which react with the zinc anode. Cathode catalyst may contain carbon material. Embedded in the cathode catalyst is a current collector (not shown) that may be composed of a nickel mesh. The cathode current collector is electrically connected to the metal cathode base 114. A separator or "barrier layer" (not shown) is typically present to prevent zinc particles from reaching the catalyst while allowing the passage of hydroxyl ions through it.

An acoustic assembly of a hearing assistance device (e.g., acoustic assembly 206 in FIG. 12) may be mounted to the battery 100 and, in the illustrated embodiment, the exemplary battery can anode portion 106b is provided with an acoustic assembly support surface 146 which has a shape that corresponds to the shape of the adjacent portion of the acoustic assembly. The support surface 146 may in some instances, including the illustrated embodiment, be a relatively flat, recessed area defined between side protrusions 148 and a lateral end protrusion 150. The protrusions 148 and 150 align the acoustic assembly relative to the battery and also shift some of the battery volume to a more volumetrically efficient location. In other implementations, the acoustic assembly support surface 146 and protrusions 148 may be omitted. The size and shape of the outer perimeter of the end 152 of the battery can anode portion 106b corresponds to the size and shape of the outer perimeter of the bottom wall 120 of the battery can cathode portion 106a to facilitate mating of the cathode and anode assemblies 102 and 104. In the illustrated implementation, the size and shape of the outer perimeter of the end 152 of the battery can anode portion 106b is the same as the size and shape of the outer perimeter of the bottom wall 120 of the battery can cathode portion 106a to facilitate mating of the cathode and anode assemblies 102 and 104 in the manner illustrated in FIGS. 1 and 7. In other implementations, the size and shape of the outer perimeter of the bottom wall 120 may be equal to or slightly less than that of the inner surface of the end 152 so that the air cathode may be press fit a short distance into the anode subassembly prior to joining the anode and cathode assemblies to one another.

Figure 8:
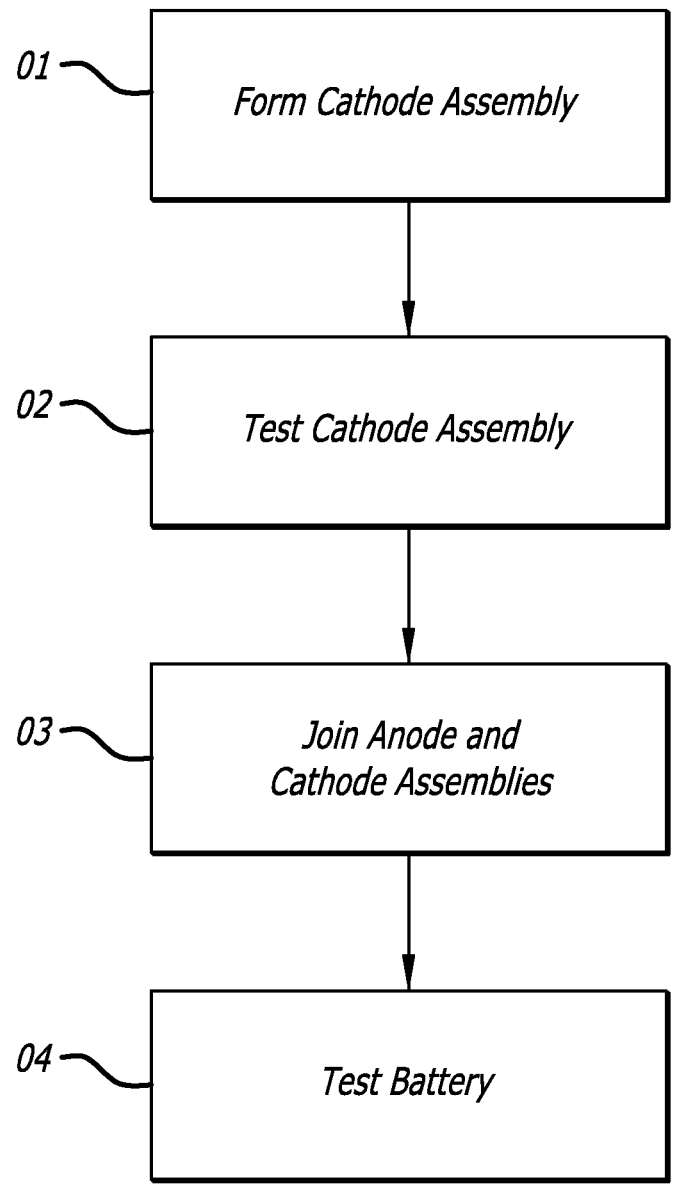
FIG. 8 is a flow chart showing a method in accordance with one embodiment of a present invention.

Turning to FIG. 8, the exemplary batteries may be manufactured as follows. In Step 01, a cathode assembly 102 (FIGS. 1-4) is formed. For example, the air cathode 110, gas diffusion barrier 112, cathode base 114, filter 116 and grommet 118 may be inserted into an uncrimped battery can cathode portion 106a' (FIG. 3). The side wall 124 is then crimped to form the crimped region 126 of the battery can cathode portion 106a and a leak tight seal. The crimped region 126 may also be omitted. Here, an air cathode (e.g., air cathode 110) may be placed into a battery can cathode portion and sealed through the use of techniques such as, for example, adhesive bonding, hot-melt bonding, ultrasonic welding and laser welding. It should be emphasized here that the crimping, or other form of sealing the cathode assembly within the battery can cathode portion, takes place in the absence of the battery can anode portion. In Step 02, the completed cathode assembly 102 is tested. Such testing may include, but is not limited to, testing air flow into the air cathode 110. Air should not flow between the outer surface of the grommet 118 and the inner surface of the battery can cathode portion 106a, or around the gas diffusion barrier 112 and air cathode 110 along the inner surface of the grommet. Air flow may be tested by, for example, an air permeability test instrument from Gurley Precision Instruments, Inc. of Troy, N.Y., a leak detector, or an oxygen sensor. Cathode assemblies that pass the test(s) in Step 02 may be joined to an anode assembly 104 to form the battery 100. To that end, in Step 03, a cathode assembly 102 is joined to the anode assembly 104. In particular, the battery can cathode and anode portions 106a and 106b are joined to one another by a process such as, for example, adhesive bonding (e.g., reactive or hot melt), soldering (e.g., soldering with low melting temperature metal and nanobonding through nanofoil), brazing, welding (e.g., laser or ultrasonic), and mechanical interlocking (e.g., with threads on the battery can cathode and anode portions). The battery 100 may also undergo additional post-production processing, which is represented by Step 04. Such steps may, for example, include placing the battery 100 in a centrifuge to drive the anode material 145 toward the cathode assembly 102, testing for electrolyte leakage (e.g., visual testing or pH detection), quarantining the battery for a predetermined period (e.g., for two weeks) during which the limiting current of the battery is periodically tested. Batteries that fail these tests are scrapped.

As noted above, the present methods may involve combining identical cathode assemblies with a variety of different anode assemblies. To that end, and referring to FIGS. 9a-9c, battery can anode portions 106b, 106b-1 and 106b-2 have different sizes and shapes. As compared to the battery can anode portion 106b, the anode portion 106b-1 is shorter and has a larger maximum girth while the anode portion 106b-2 is still shorter and has the same maximum girth. In all three instances, however, the size and shape of the outer perimeter of the end 152 is the same and, in the illustrated implementation, the size and shape corresponds to the size and shape of the outer perimeter of the bottom wall 120 of the battery can cathode portion 106a. As such, the battery can anode portions 106b, 106b-1 and 106b-2 may be filled with anode material 145 and joined to the battery can cathode portion 106a of identical cathode assemblies 102 to form the batteries 100, 100-1 and 100-2, as illustrated in FIGS. 10a-10c.

The battery can cathode and anode portions 106a and 106b are not limited to any particular materials, and may be formed from the same materials (or the same combination of materials) or different materials (or different combinations of materials). For example, the anode portion 106b may be a multi-layer structure that includes an inner layer and an outer layer. The inner layer may be formed from a material that has strong hydrogen overpotential, such as an oxygen-free copper that forms a surface alloy which inhibits oxidation and reducing reactions with the zinc (or other metal inside the anode portion). Other suitable metals for the inner layer include tin and cadmium. The structural layer, which defines the majority of the wall thickness, provides the structural support for the anode portion. Suitable materials for the structural layer include, but are not limited to, nickel, nickel-cobalt, and nickel alloys. In some implementations, the structural layer is the outer layer. In others, a thin silver or gold layer (or "silver flash" or "gold flash") may be located on the exterior surface of the nickel layer. The silver or gold layer inhibits nickel release from the can and aids in presenting a surface that is easier to form electrical connections to with solder than does, for example, nickel. Similar materials may be employed for the battery can cathode portion 106a. Here, however, there is no need for an inner layer formed from a material that has strong hydrogen overpotential so long as the inner surface has not contact with the anode material and electrolyte. Instead, the bottom surface of the bottom wall 120 (FIG. 2), i.e., the surface that faces the anode material 145 (FIG. 7), may include an outer layer formed from oxygen-free copper or other suitable material.

Figure 11:
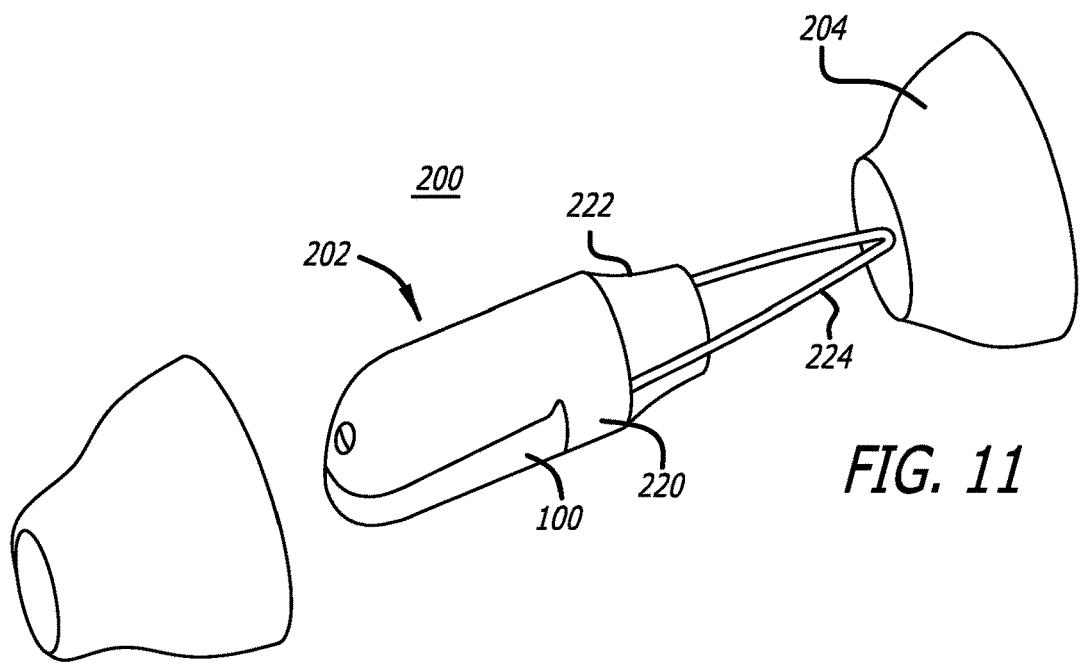
FIG. 11 is an exploded perspective view of a hearing device in accordance with one embodiment of a present invention.
Figure 12:
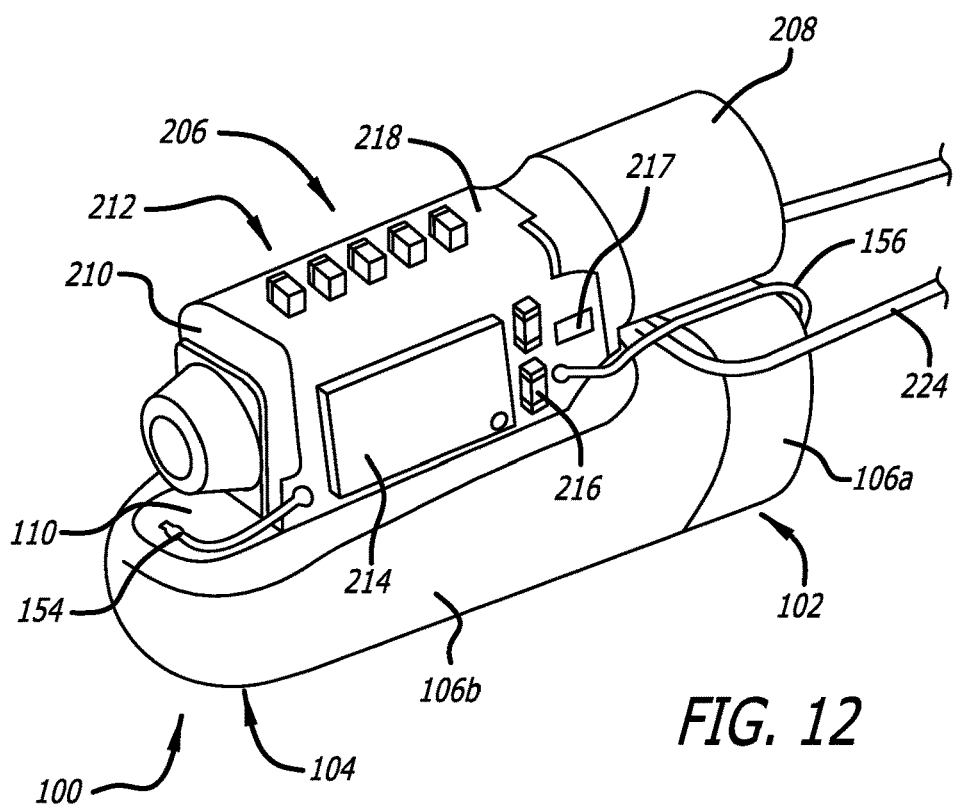
FIG. 12 is a perspective view of a portion of the hearing assistance device illustrated in FIG. 11.

One example of a hearing assistance device that may include the present batteries is the completely in the canal extended wear hearing device generally represented by reference numeral 200 in FIGS. 11 and 12. Hearing device 200 consists of a core 202, the battery 100, and a pair of seals 304 that support the core 202 within the ear canal bony portion. In addition to the battery, the core 202 includes an acoustic assembly 206 with a microphone 208, a receiver 210 and a flexible circuit 212. The exemplary flexible circuit 212 includes an integrated circuit or amplifier 214 and other discreet components 216, such as a sound generator 217 that supplies a "low battery" signal to the receiver 210, on a flexible substrate 218. The acoustic assembly 206 is encased by encapsulant 220 in the illustrated embodiment. In other embodiments, the core components may be located within a housing. A contamination guard 222 abuts the microphone. A handle 224 may also be provided. Additional details concern this type of hearing assistance device may be found in U.S. Pat. No. 8,761,423, which is incorporated herein by reference. The exemplary battery 100 is electrically connected to the flexible circuit 212 by way of anode and cathode wires 154 and 156 (FIG. 12). The battery may, in other implementations, be connected to a similar flexible circuit via tabs (not shown) of the flexible circuit that attach to the battery. In still other implementations, the anode and cathode wires may be omitted and replaced by anode and cathode contacts on the cathode assembly.

Although batteries manufactured in accordance with the present invention are not limited to any particular size, the batteries are well suited for use in extended wear hearing devices such as the Phonak LYRIC® extended wear hearing device. Exemplary relatively small battery sizes for use in extended wear hearing devices include batteries with a length of about 9.8 mm to 10.0 mm, a minor axis length of 3.4 mm to 3.6 mm (at the cathode assembly), and a major axis dimension of 3.5 mm to 3.6 mm (at the cathode assembly). The minor axis dimension at the acoustic assembly support surface 146 in the exemplary battery sizes is about 2.4 mm to 2.6 mm.

Although the inventions disclosed herein have been described in terms of the preferred embodiments above, numerous modifications and/or additions to the above-described preferred embodiments would be readily apparent to one skilled in the art. By way of example, but not limitation, the inventions include any combination of the elements from the various species and embodiments disclosed in the specification that are not already described. It is intended that the scope of the present inventions extend to all such modifications and/or additions and that the scope of the present inventions is limited solely by the claims set forth below.

We claim:

1. A method, comprising the steps of:
    testing a cathode assembly, that includes an air cathode and a battery can cathode portion that is not connected to a battery can anode portion, by testing leakage of air between surfaces within the battery can cathode portion; and
    joining an anode assembly, including a battery can anode portion in which anode material is located, to the tested cathode assembly.

2. The method as claimed in claim 1, wherein
the cathode assembly includes a grommet; and
the step of testing comprises testing leakage along the grommet.

3. The method as claimed in claim 1, wherein
the step of joining comprises joining the battery can anode portion to the battery can cathode portion by a process selected from the group consisting of adhesive bonding, soldering, brazing, welding, and mechanical interlocking.

4. The method as claimed in claim 1, further comprising the steps of:
    prior to joining, selecting from a plurality of anode assemblies, each of which is capable of being joined to the cathode assembly.

5. The method as claimed in claim 1, further comprising the step of
    prior to testing, crimping a portion of the battery can cathode portion around the air cathode.

6. The method as claimed in claim 1, further comprising the steps of:
    prior to testing, sealing the air cathode within the battery can cathode portion to form the cathode assembly; and
    prior to joining, selecting the anode assembly from a plurality of anode assemblies, each of which includes a battery can anode portion in which anode material is located and is capable of being joined to the cathode assembly.

7. The method as claimed in claim 6, wherein
the step of sealing comprises crimping a portion of the battery can cathode portion over the air cathode within the battery can cathode portion.

8. The method as claimed in claim 6, wherein
the step of sealing comprises bonding the air cathode to and within the battery can cathode portion.

9. The method as claimed in claim 6, wherein
the step of joining comprises joining the battery can anode portion to the battery can cathode portion by a process selected from the group consisting of adhesive bonding, soldering, brazing, welding, and mechanical interlocking.

10. The method as claimed in claim 6, wherein
the air cathode includes a gas diffusion barrier that regulates air flow into the air cathode; and
the step of testing comprises testing air flow into the air cathode.

\* \* \* \* \*